United States Patent
Kok

(10) Patent No.: US 6,363,117 B1
(45) Date of Patent: Mar. 26, 2002

(54) VIDEO COMPRESSION USING FAST BLOCK MOTION ESTIMATION

(75) Inventor: Chi Wah Kok, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/223,867

(22) Filed: Dec. 31, 1998

(51) Int. Cl.[7] .................................................. H04N 7/12
(52) U.S. Cl. ............................................... 375/240.24
(58) Field of Search ...................... 375/240.01, 240.12, 375/240.16, 240.21, 240.24, 240.17

(56) References Cited

PUBLICATIONS

Koga et al, "Motion Compensated Interframe Coding for Video Conferencing", Nov. 1981, IEEE, pp. C9.6.1–C9.6.5.*

Li et al, "A New Three–Step Search Algorithm for Block Motion Estimation", Aug. 1994, IEEE Trans. CASVT, pp. 438–442.*

Po et al, "A Novel Four–Step Search Algorithm for Fast Block Motion Estimation", Jun. 1996, IEEE Trans. CASVT, pp. 313–317.*

Liu et al, "A Block–Based Gradient Descent Search Algorithm for Block Motion Estimation in Video Coding", Aug. 1996, IEEE Trans. CASVT, pp. 419–422.*

* cited by examiner

*Primary Examiner*—Young Lee
(74) *Attorney, Agent, or Firm*—Ronald C. Card; Harold T. Fujii

(57) ABSTRACT

The present invention provides fast block motion estimation. In one embodiment, a process for fast block motion estimation decimates search locations in a hierarchical manner to reduce the computational complexity of block motion estimation. Different search window sizes and decimation patterns are used at different stages of the search. The use of a large window size in the first stage and different decimation patterns in the following stages reduces the risk of being trapped in local minima. In one embodiment, the process for fast motion estimation uses fast stopping criteria for search locations near the center of the search window, which makes the process center-biased. The average number of search locations examined for each block motion estimation is computationally efficient, and the block motion estimation accuracy is of high quality.

18 Claims, 12 Drawing Sheets

|    | -8 | -7 | -6 | -5 | -4 | -3 | -2 | -1 | 0 | 1 |
|----|----|----|----|----|----|----|----|----|---|---|
| -8 |    | 33 | 33 | 32 | 32 | 30 | 30 | 30 | 30 | 30 | 30 | 30 | 32 | 32 | 33 | 33 |    |
| -7 | 33 | 33 | 33 | 32 | 32 | 30 | 30 | 30 | 30 | 30 | 30 | 30 | 32 | 32 | 33 | 33 | 33 |
| -6 | 33 | 33 | 32 | 32 | 32 | 30 | 30 | 30 | 30 | 30 | 30 | 30 | 32 | 32 | 32 | 33 | 33 |
| -5 | 32 | 32 | 32 | 32 | 32 | 32 | 30 | 30 | 30 | 30 | 30 | 32 | 32 | 32 | 32 | 32 | 32 |
| -4 | 32 | 32 | 32 | 32 | 27 | 27 | 27 | 27 | 27 | 27 | 27 | 27 | 27 | 32 | 32 | 32 | 32 |
| -3 | 30 | 30 | 30 | 32 | 27 | 27 | 27 | 27 | 27 | 27 | 27 | 27 | 27 | 32 | 30 | 30 | 30 |
| -2 | 30 | 30 | 30 | 32 | 27 | 27 | 24 | 24 | 24 | 24 | 24 | 27 | 27 | 32 | 30 | 30 | 30 |
| -1 | 30 | 30 | 30 | 30 | 27 | 27 | 24 | 24 | 21 | 24 | 24 | 27 | 27 | 30 | 30 | 30 | 30 |
| 0  | 30 | 30 | 30 | 30 | 27 | 27 | 24 | 21 | 21 | 21 | 24 | 27 | 27 | 30 | 30 | 30 | 30 |
| 1  | 30 | 30 | 30 | 30 | 27 | 27 | 24 | 24 | 21 | 24 | 24 | 27 | 27 | 30 | 30 | 30 | 30 |
| 2  | 30 | 30 | 30 | 32 | 27 | 27 | 24 | 24 | 24 | 24 | 24 | 27 | 27 | 32 | 30 | 30 | 30 |
| 3  | 30 | 30 | 30 | 32 | 27 | 27 | 27 | 27 | 27 | 27 | 27 | 27 | 27 | 32 | 30 | 30 | 30 |
| 4  | 32 | 32 | 32 | 32 | 27 | 27 | 27 | 27 | 27 | 27 | 27 | 27 | 27 | 32 | 32 | 32 | 32 |
| 5  | 32 | 32 | 32 | 32 | 27 | 27 | 27 | 27 | 27 | 27 | 27 | 27 | 27 | 32 | 32 | 32 | 32 |
| 6  | 33 | 33 | 32 | 32 | 32 | 32 | 30 | 30 | 30 | 30 | 30 | 32 | 32 | 32 | 32 | 33 | 33 |
| 7  | 33 | 33 | 33 | 32 | 32 | 30 | 30 | 30 | 30 | 30 | 30 | 30 | 32 | 32 | 33 | 33 | 33 |
| 8  |    | 33 | 33 | 32 | 32 | 30 | 30 | 30 | 30 | 30 | 30 | 30 | 32 | 32 | 33 | 33 |    |

FIG. 4a

|    | -8 | -7 | -6 | -5 | -4 | -3 | -2 | -1 | 0 | 1 |
|----|----|----|----|----|----|----|----|----|---|---|
| -8 |    | 33 | 33 | 32 | 32 | 30 | 30 | 30 | 30 | 30 | 30 | 30 | 32 | 32 | 33 | 33 |    |
| -7 | 33 | 33 | 33 | 32 | 32 | 30 | 30 | 30 | 30 | 30 | 30 | 30 | 32 | 32 | 33 | 33 | 33 |
| -6 | 33 | 33 | 32 | 32 | 32 | 30 | 30 | 30 | 30 | 30 | 30 | 30 | 32 | 32 | 32 | 33 | 33 |
| -5 | 32 | 32 | 32 | 32 | 32 | 32 | 30 | 30 | 30 | 30 | 30 | 32 | 32 | 32 | 32 | 32 | 32 |
| -4 | 32 | 32 | 32 | 32 | 27 | 27 | 27 | 27 | 27 | 27 | 27 | 27 | 27 | 32 | 32 | 32 | 32 |
| -3 | 30 | 30 | 30 | 32 | 27 | 27 | 27 | 27 | 27 | 27 | 27 | 27 | 27 | 32 | 30 | 30 | 30 |
| -2 | 30 | 30 | 30 | 32 | 27 | 27 | 24 | 24 | 24 | 24 | 24 | 27 | 27 | 32 | 30 | 30 | 30 |
| -1 | 30 | 30 | 30 | 30 | 27 | 27 | 24 | 24 | 21 | 24 | 24 | 27 | 27 | 30 | 30 | 30 | 30 |
| 0  | 30 | 30 | 30 | 30 | 27 | 27 | 24 | 21 | 21 | 21 | 24 | 27 | 27 | 30 | 30 | 30 | 30 |
| 1  | 30 | 30 | 30 | 30 | 27 | 27 | 24 | 24 | 21 | 24 | 24 | 27 | 27 | 30 | 30 | 30 | 30 |
| 2  | 30 | 30 | 30 | 32 | 27 | 27 | 24 | 24 | 24 | 24 | 24 | 27 | 27 | 32 | 30 | 30 | 30 |
| 3  | 30 | 30 | 30 | 32 | 27 | 27 | 27 | 27 | 27 | 27 | 27 | 27 | 27 | 32 | 30 | 30 | 30 |
| 4  | 32 | 32 | 32 | 32 | 27 | 27 | 27 | 27 | 27 | 27 | 27 | 27 | 27 | 32 | 32 | 32 | 32 |
| 5  | 32 | 32 | 32 | 32 | 27 | 27 | 27 | 27 | 27 | 27 | 27 | 27 | 27 | 32 | 32 | 32 | 32 |
| 6  | 33 | 33 | 32 | 32 | 32 | 32 | 30 | 30 | 30 | 30 | 30 | 32 | 32 | 32 | 32 | 33 | 33 |
| 7  | 33 | 33 | 33 | 32 | 32 | 30 | 30 | 30 | 30 | 30 | 30 | 30 | 32 | 32 | 33 | 33 | 33 |
| 8  |    | 33 | 33 | 32 | 32 | 30 | 30 | 30 | 30 | 30 | 30 | 30 | 32 | 32 | 33 | 33 |    |

FIG. 4b

VIDEO COMPRESSION USING FAST BLOCK MOTION ESTIMATION

BACKGROUND

1. Field of the Invention

The present invention relates generally to communication technology and, more particularly, to video compression technology.

2. Background of the Invention

Motion compensated video coding is an efficient video compression technique. Motion compensated video coding exploits the temporal redundancy between successive video frames by motion estimation. Selected among different motion estimation techniques, block-based motion estimation was adopted in the MPEG-4 standard (a multimedia network standard of the Moving Pictures Expert Group), and the ITU/T H.263 video coding standard. Block-based motion estimation is efficient and easily implemented for both hardware and software. In block-based video coding, video frames are divided into blocks. Each block is associated with a vector (i.e., a motion vector) to describe the location of the block in the reference frame that provides the best match under some block distortion measure (BDM). The block in the reference frame that provides the best match is used to predict the current block in motion compensated video coding. By encoding the motion vectors and possibly the prediction residues, the video sequence is compressed with high compression efficiency (e.g., because the entropy of the prediction residue plus that of the motion vector is lower than the entropy of the original video frame).

However, block-based motion estimation is a computationally expensive process. A full search (FS) motion estimation, which searches all the possible candidates within a predetermined search window (e.g., a 15×15 window with zero motion as the center of the window) in the reference frame for the best estimation, can use up to 70% of the video encoding time. Various fast motion estimation techniques have been developed for various practical applications of video encoding. However, the fast motion techniques that have been developed are sub-optimal, because they are susceptible to being trapped in local optima (e.g., local minima) and do not provide as high of quality (i.e., accuracy of motion estimation) as the FS motion estimation.

SUMMARY OF THE INVENTION

Accordingly, the present invention provides fast block motion estimation that is computationally efficient, but avoids the risk of being trapped in local optima and approaches the accuracy of the FS motion estimation. In one embodiment, a process for video compression using fast block motion estimation includes: searching for a first minimum block distortion measure (BDM) point in a first search window using a first sampling grid of a second search window, in which the second search window includes a subset of search locations contained in the first search window; and searching for a second minimum BDM point in the first search window using a second sampling grid of a third search window, if the first minimum BDM point is located in a center of the second search window, in which the third search window includes a subset of the search locations contained in the first search window, and the third search window is centered according to a location of the first minimum BDM point. The process can also include searching for a third minimum BDM point in the first search window using a third sampling grid of a fourth search window, if the first minimum BDM point is not located in the center of the second search window, in which the fourth search window includes a subset of the search locations contained in the first search window, and in which the fourth search window is centered according to the location of the first minimum BDM point. The process can also include searching for a fourth minimum BDM point in the first search window using a fourth sampling grid of a fifth search window, if each previously located minimum BDM point of the first search window is located outside of the second search window, in which the fifth search window includes a subset of search locations contained in the first search window, and the fifth search window is centered according to the location of the third minimum BDM point. The process can also include searching for a fifth minimum BDM point in the first search window using a fifth sampling grid of a sixth search window, in which the sixth search window includes a subset of search locations contained in the first search window, and the sixth search window is centered according to an overall minimum BDM point. The search windows and the search locations can overlap, and overlapped search locations can be skipped for computational efficiency. Also, the sampling grids can each include different sub-sampling patterns of search locations of the first search window. In one embodiment, the first search window includes 17×17 search locations, the second search window includes 7×7 search locations, the third search window includes 3×3 search locations, the fourth search window includes 5×5 search locations, the fifth search window includes 5×5 search locations, and the sixth search window includes 3×3 search locations.

In one embodiment, the first search window includes more than 17×17 search locations, and the process further includes: searching for an intermediate BDM point in the first search window using the fourth sampling grid of the fifth search window, if the previously located minimum BDM point is located on the fourth sampling grid of a previous search window, in which a current search window is centered according to the location of the previously located minimum BDM point; and repeating the search for the intermediate BDM point for a predefined number of repetitions, if the previously located minimum BDM point is located on the fourth sampling grid of the previous search window. For example, the first search window size equals a video frame size for global motion estimation, a video frame is interpolated, and the search windows operate on an interpolated frame for sub-pixel motion estimation.

Other aspects and advantages of the present invention will become apparent from the following detailed description and accompanying drawings.

BRIEF DESCRIPTION OF THE DRAWINGS

FIGS. 4(a) and 4(b) illustrate the expected number of BDM computations for each of the motion vectors of the fast block motion estimation technique of FIG. 2 executed in a 17×17 search window in accordance with one embodiment of the present invention.

DETAILED DESCRIPTION OF THE INVENTION

Figure 1:
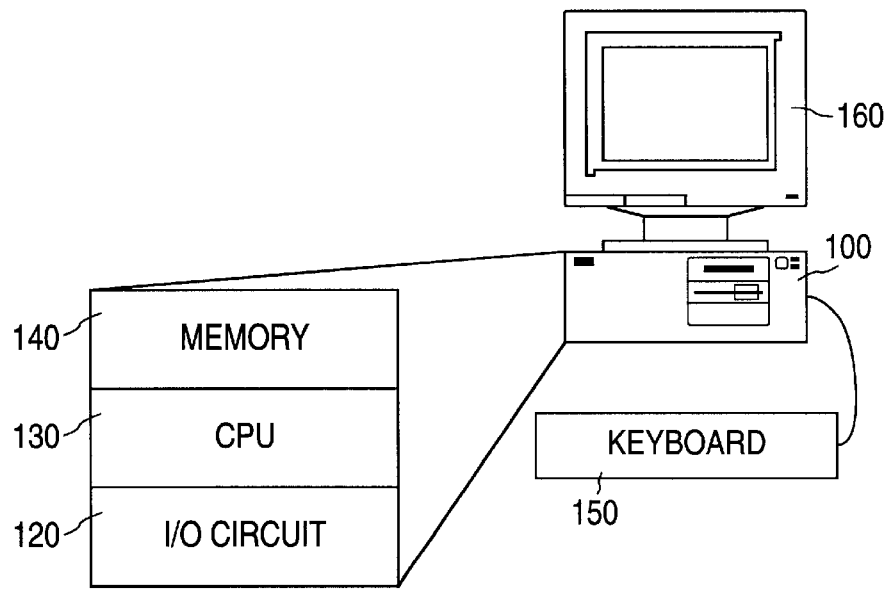
FIG. 1 is a block diagram of a data processing system in accordance with one embodiment of the present invention.

FIG. 1 illustrates a data processing system in accordance with one embodiment of the present invention. FIG. 1 shows a computer 100, which includes three major elements. Computer 100 includes an input/output (I/O) circuit 120, which is used to communicate information in appropriately structured form to and from other portions of computer 100 and other devices or networks external to computer 100. Computer 100 includes a central processing unit (CPU) 130 (e.g., a microprocessor) in communication with I/O circuit 120 and a memory 140 (e.g., volatile and non-volatile memory). These elements are those typically found in most general purpose computers and, in fact, computer 100 is intended to be representative of a broad category of data processing devices.

A raster display monitor 160 is shown in communication with I/O circuit 120 and issued to display images (e.g., video sequences) generated by CPU 130. Any well-known type of cathode ray tube (CRT) display or other type of display can be used as display 160. A conventional keyboard 150 is also shown in communication with I/O circuit 120.

It will be appreciated by one of ordinary skill in the art that computer 100 can be part of a larger system. For example, computer 100 can also be in communication with a network, such as connected to a local area network (LAN) or the Internet.

In particular, computer 100 can include circuitry that implements fast block motion estimation for multimedia communication in accordance with the teachings of the present invention. In one embodiment, as will be appreciated by one of ordinary skill in the art, the present invention can be implemented in software executed by computer 100 (e.g., the software can be stored in memory 140 and executed on CPU 130), as further discussed below.

The present invention can also be implemented in circuitry, software, or any combination thereof for various other types of data processing devices. For example, the present invention can be implemented in a mobile phone to provide for wireless video communication.

Generally, search location sub-sampling techniques sub-sample the search locations. Instead of examining all the possible search locations as in the FS motion estimation technique, only a subset of the search locations are examined. As a result, the computational complexity of the motion estimation technique is reduced by a factor of the sub-sampling ratio of the search locations when compared to FS. A number of fast block motion estimation techniques, such as the 3 Stage Search (3SS) (See, e.g., T. Koga, K. Ilinuma, A. Hirano, Y. Iijima, and T. Ishiguro, "Motion compensated interframe coding for video conferencing," {\it Prof. NTC 81,} New Orleans, pp. C9.6.1–C9.6.5, November 1981), the New 3 Stage Search (N3SS) (See, e.g., R. Li, B. Zeng, and M. L. Liou, "A new three-step search algorithm for block motion estimation," {\it IEEE Trans. CASVT,} pp. 438–442, August 1994), the 4 Stage Search (4SS) (See, e.g., L. M. Po and W. C. Ma, "A novel four-step search algorithm for fast block motion estimation,", {\it IEEE Trans. CASVT}, pp. 313–317, June 1996), and the Block-based Gradient Descent Search (BBGDS) (See, e.g., L. K. Liu and E. Feig, "A block-based gradient descent search algorithm for block motion estimation in video coding," {\it IEEE Trans. CSVT,} pp. 419–422, August 1996) are based on search position sub-sampling. These techniques assumed that the BDM decreases monotonically from the global minimum inside the search window.

However, this assumption is not necessarily correct, because there may be a number of local minima in the BDM surface across the search window. In particular, there is a probability that the above technique can be trapped in local optima (e.g., a local minimum). Moreover, some of the techniques use the same search patterns and search methods for different scenarios. As a result, the computational complexity for the worst case scenario, the average case scenario, and the best case scenario can be significantly different, which can affect the resource allocation in the video coder.

Accordingly, in one embodiment, a computationally efficient and highly accurate fast block motion estimation technique is provided. The technique advantageously avoids the problem of being trapped in local optima. Moreover, the technique is uniform over a wide variety of video sequences, which allows for improved video coder system performance.

FIGS. 2(a)–(g) are block diagrams illustrating the stages of operation of the execution of a fast block motion estimation technique on a 7×7 search window in accordance with one embodiment of the present invention. In particular, the technique is based on search location sub-sampling to achieve computationally efficient block motion estimation. A hierarchical search window size is employed in each search stage. However, unlike other search location sub-sampling techniques, a dither-like down-sampling pattern is employed to avoid being trapped in local optima (e.g., local minima). Furthermore, the search pattern is selected to optimize the average case performance of the video coder for a wide area of search locations. Hence, better resource allocation can be achieved, which results in improved video coder system performance.

In one embodiment, the technique requires at most four search stages to find the best block match. At each stage, different sub-sampling patterns are applied to decimate the search locations. Such a down-sampling scheme works like dither patterns applied on the search locations. The objective of using a dither-like decimation pattern is to decrease the chance of being trapped in local optima and to provide a back-tracking path for the motion estimation technique to examine an area that is conjugate to the BDM gradient directions. Although the technique will increase the number of locations to be examined at each stage, the technique provides the necessary tunneling effect to solve the minimization problem in a non-convex surface that contains multiple local minimums.

Specifically, referring to FIGS. 2(a)–(g), after the first stage of the search on a 7×7 window with 12 search locations, as described below, the center of the search window is then shifted to the search location with the minimum BDM. The window size and window location of the next stage depends on the location of the minimum BDM point in the previous stage. If the minimum BDM point is found in the center of the 7×7 window in the first stage, then the search window in the second stage is centered and reduced to a 3×3 window in the second stage, as described below. Otherwise, the search window size is reduced to a 5×5 window in the second stage, as described in greater detail below. If the minimum BDM is located outside the 5×5 window, then the search window location in the third stage depends on the location of the minimum BDM point in the previous stage, as described below. In the fourth stage, the search window size is reduced to a 3×3 window, and the search stops at this small search window, after the location of the overall BDM point among the nine search locations of the 3×3 window.

More specifically, the fast block motion technique illustrated in FIGS. 2(a)–(g) includes the following stages of operation. At stage 1, a minimum BDM point is found from 12 locations in a 7×7 window located at the center of the search window as shown in FIG. 2(a). If the minimum BDM point is found in the center of the search window, then operation proceeds to stage 2a. Otherwise, operation proceeds to stage 2b.

At stage 2a, the search window size is reduced to 3×3 on a different sampling grid as shown in FIG. 2(b). Operation then proceeds to stage 4.

At stage 2b, the search window size is reduced to a 5×5 window on a different sampling grid. Depending on the position of the previous minimum BDM location, there are overlapped search locations between stages 1 and 2b. The overlapped search locations can be skipped. As a result, if the previous minimum BDM is located in the corner of the previous search window, then the search in stage 2 would be as shown in FIG. 2(c). Otherwise, if the previous minimum BDM is located in the middle of the search window, then the search pattern would be as shown in FIG. 2(d). If the minimum BDM is found outside the 5×5 window in stage 2b, then operation proceeds to stage 3. Otherwise, operation then proceeds to stage 4.

At stage 3, the search window size and the search pattern (i.e., sampling grid) remain the same as in stage 2b, but the location of the search window depends on the location of the previous minimum BDM point. Due to different overlapping of the search locations, if the minimum BDM search location in the previous stage is located in the middle of the search window, then the search pattern in stage 3 is illustrated in FIG. 2(e). Otherwise, if the minimum BDM search location in the previous stage is located at the corner of the search window, then the search pattern is illustrated in FIG. 2(f). Operation proceeds to stage 4. In one embodiment, as discussed below, stage 3 may be repeated for performing this technique on extended search window sizes (i.e., search window sizes that are greater than 7×7 blocks or greater than 17×17 blocks), and operation eventually proceeds to stage 4.

At stage 4, the search window is reduced to a 3×3 window as shown in FIG. 2(g). The direction of the overall motion vector is considered as the minimum BDM location among these nine searching locations. The 3×3 window in this stage may overlap with search locations in previous stages. The overlapped search locations can be skipped, which is not shown in FIG. 2g.

Figure 3A:
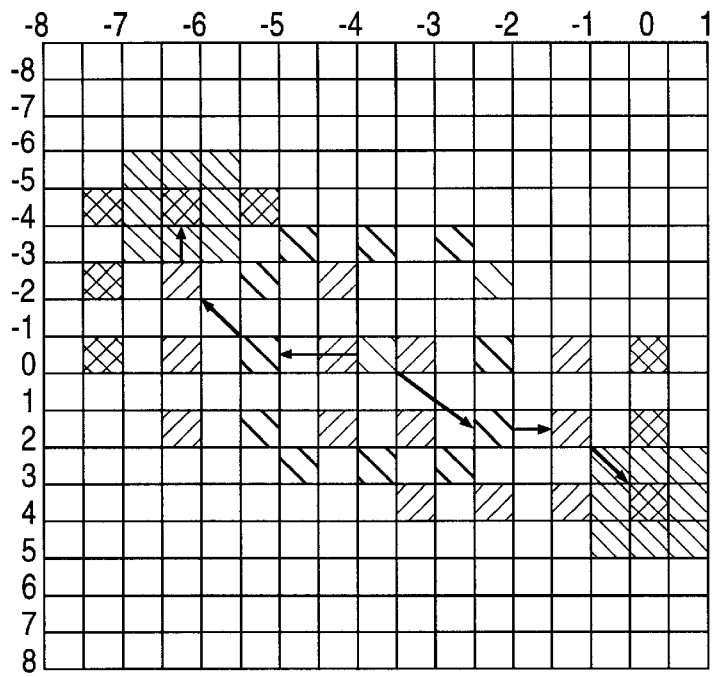
FIGS. 3(a) and 3(b) illustrate examples of a search path of the fast block motion estimation technique of FIG. 2 executed in a 17×17 search window in accordance with one embodiment of the present invention.
Figure 3B:
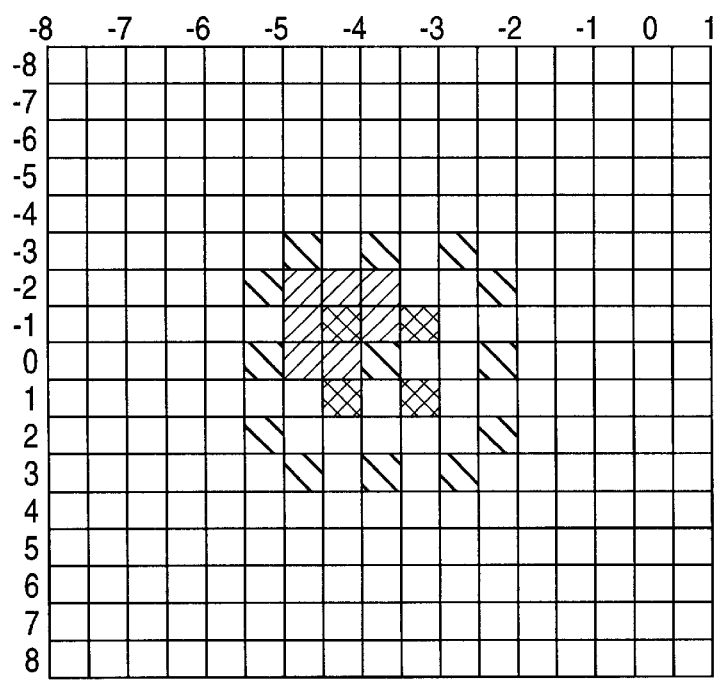
Figure 6A:
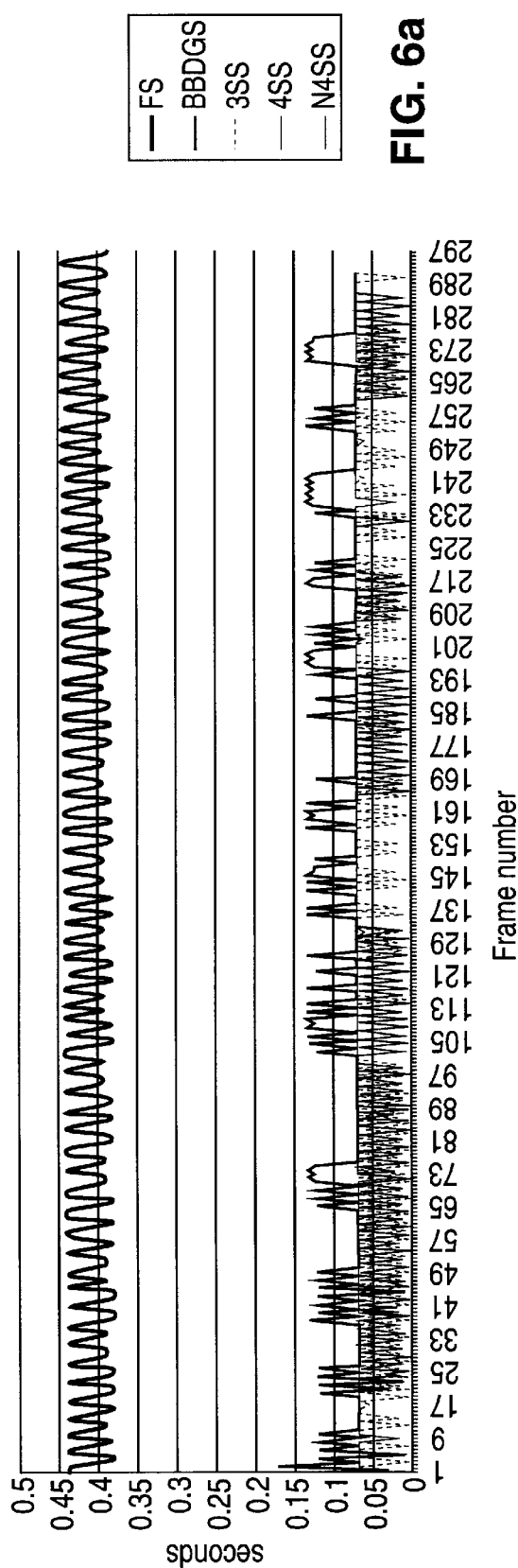
FIGS. 6(a)–(h) are graphs of simulation results of the compression time per frame of a video coder using different fast motion estimation techniques for a variety of video sequences.
Figure 6B:
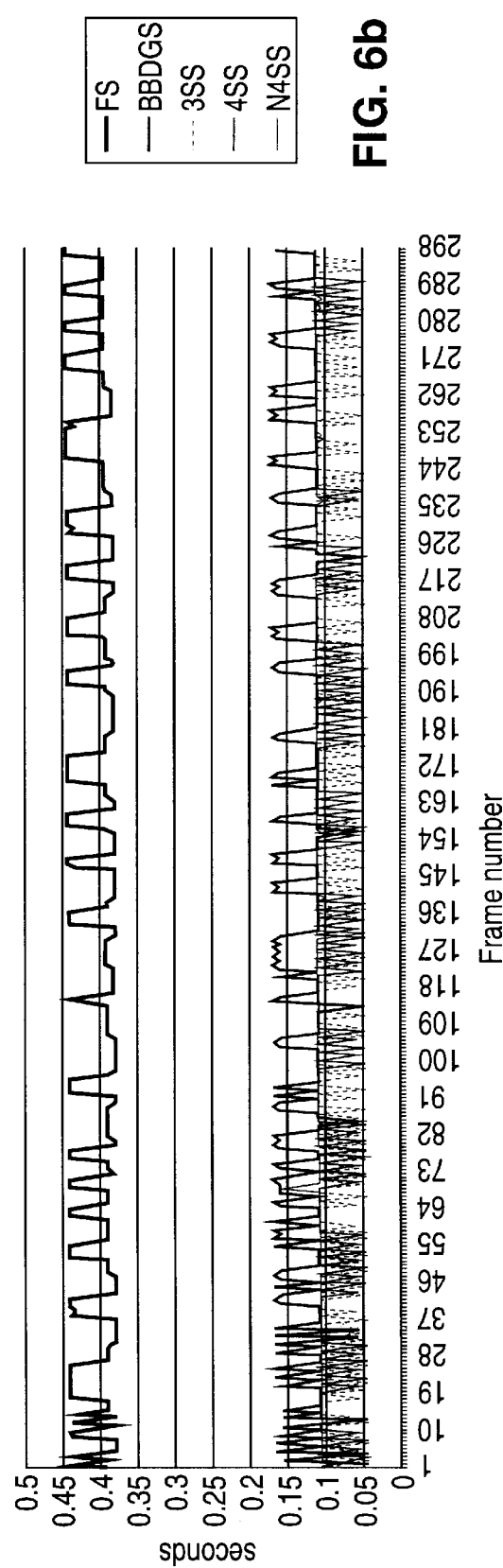
Figure 6C:
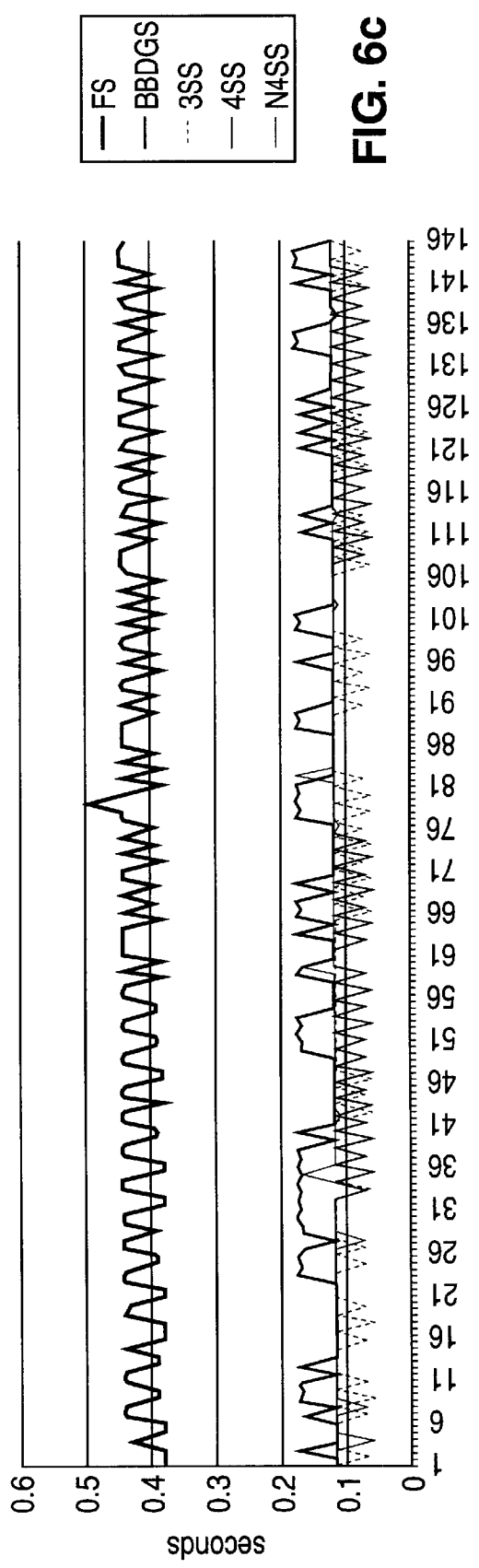
Figure 6D:
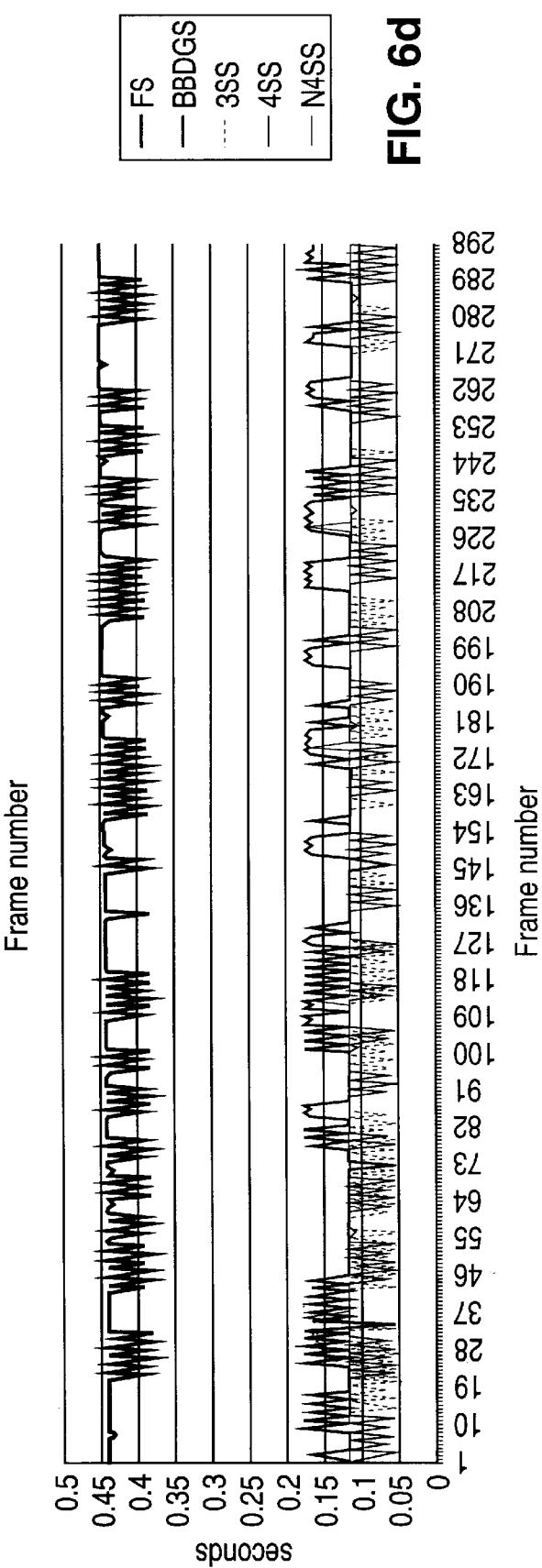
Figure 6E:
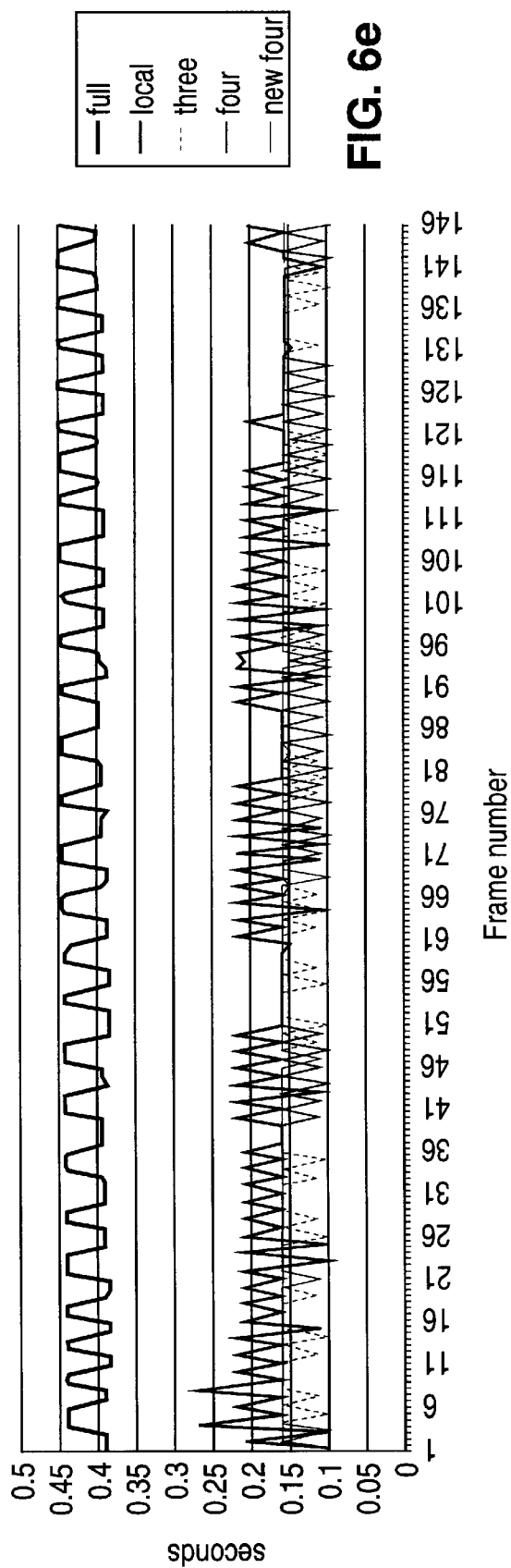
Figure 6F:
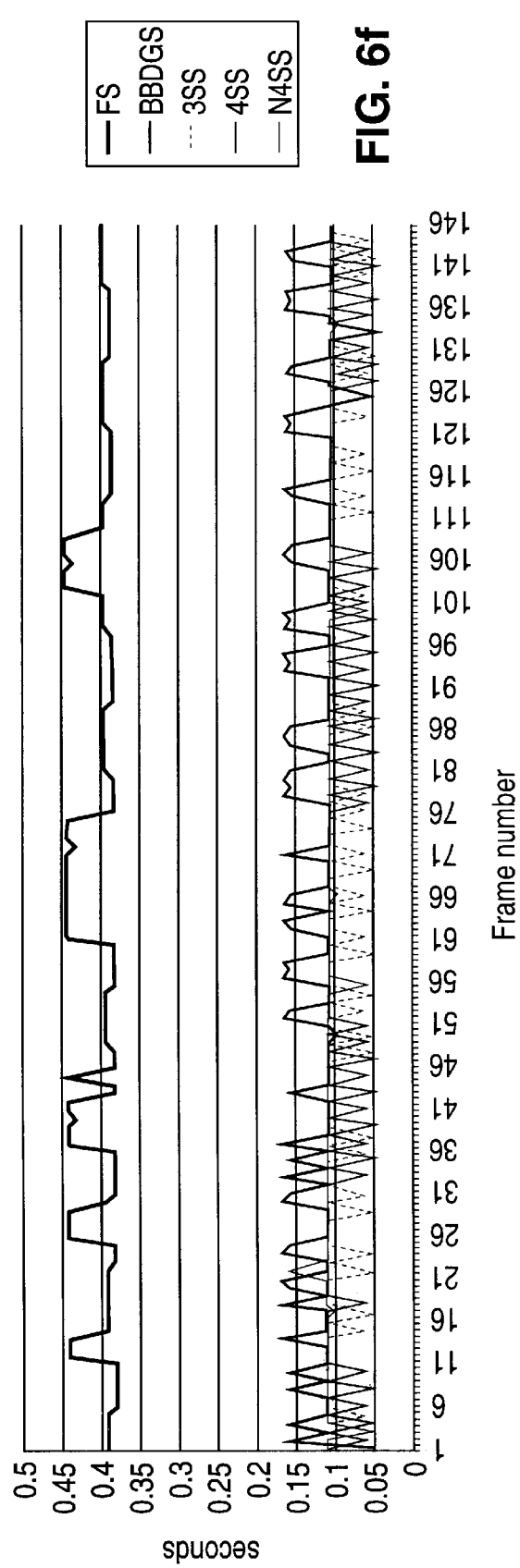
Figure 6G:
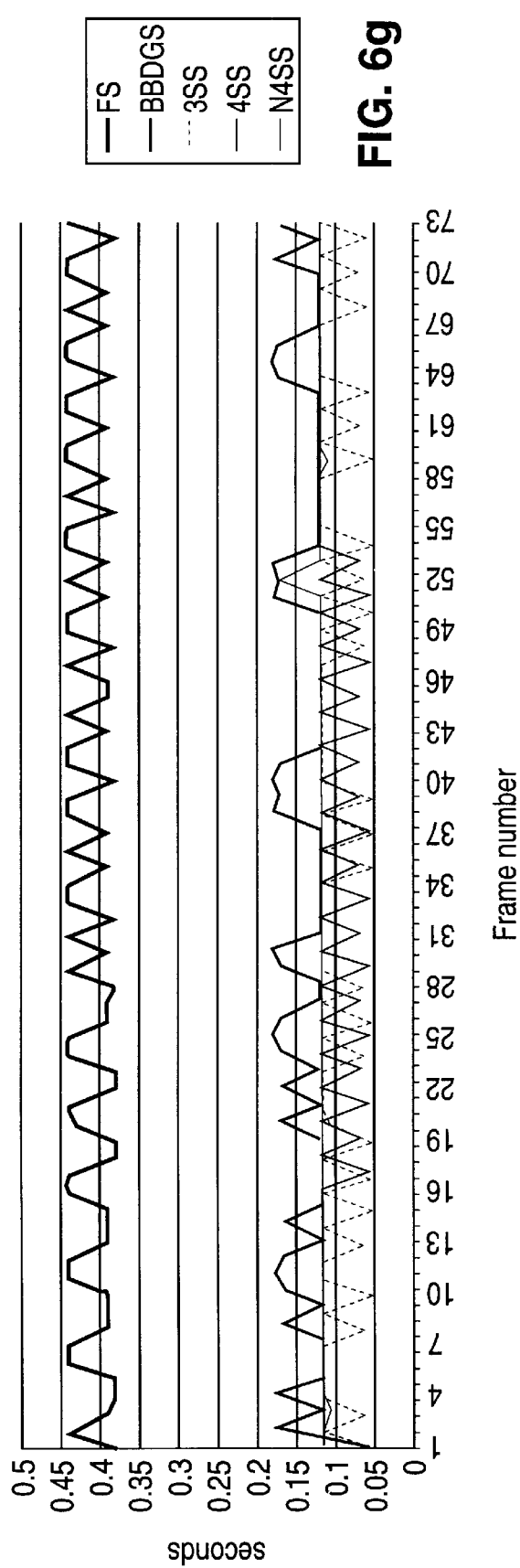
Figure 6H:
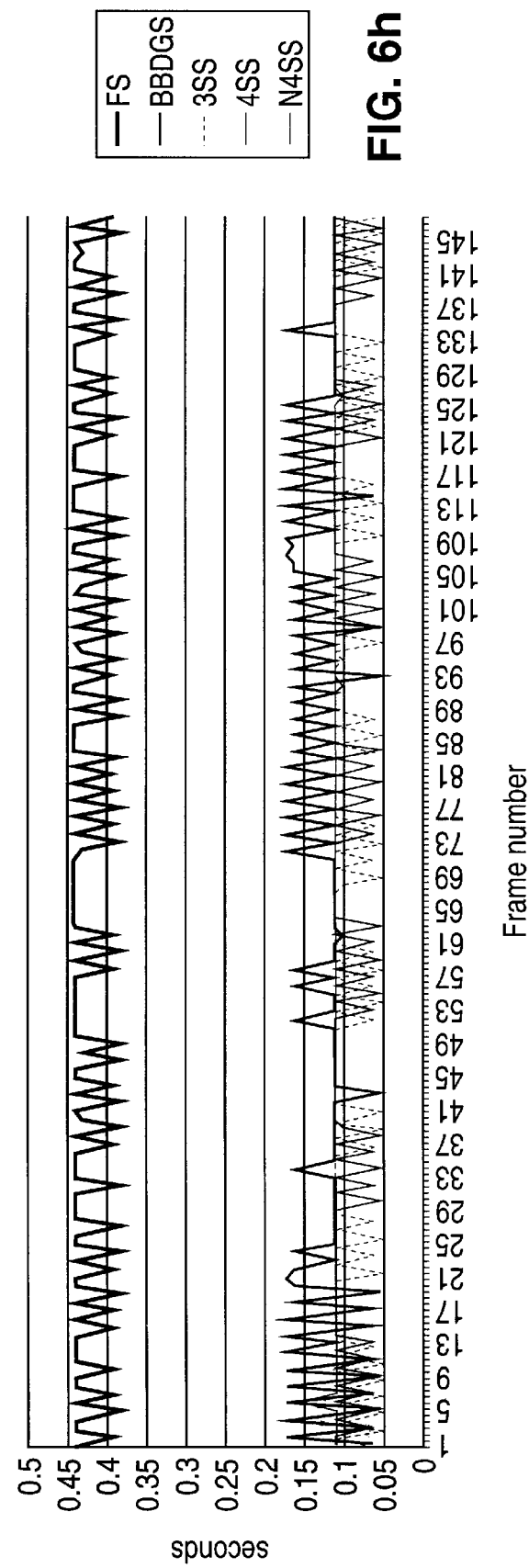
Figure 7A:
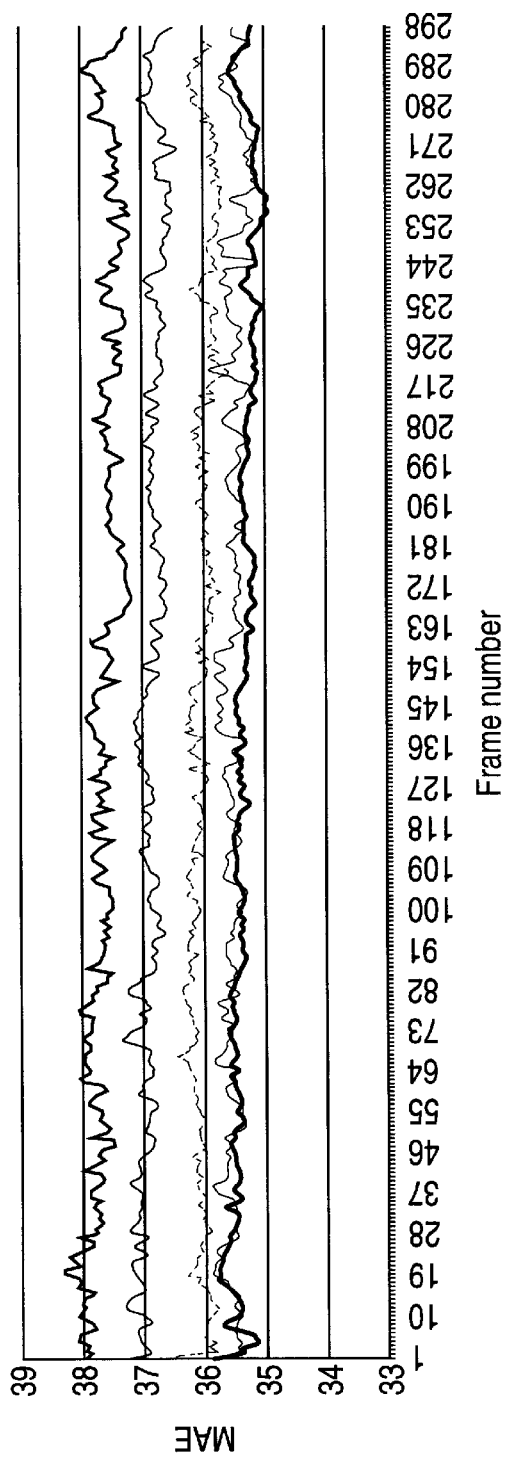
FIGS. 7(a)–(h) are graphs of simulation results of the mean absolute error (MAE) per frame of different fast motion estimation techniques for a variety of video sequences.
Figure 7B:
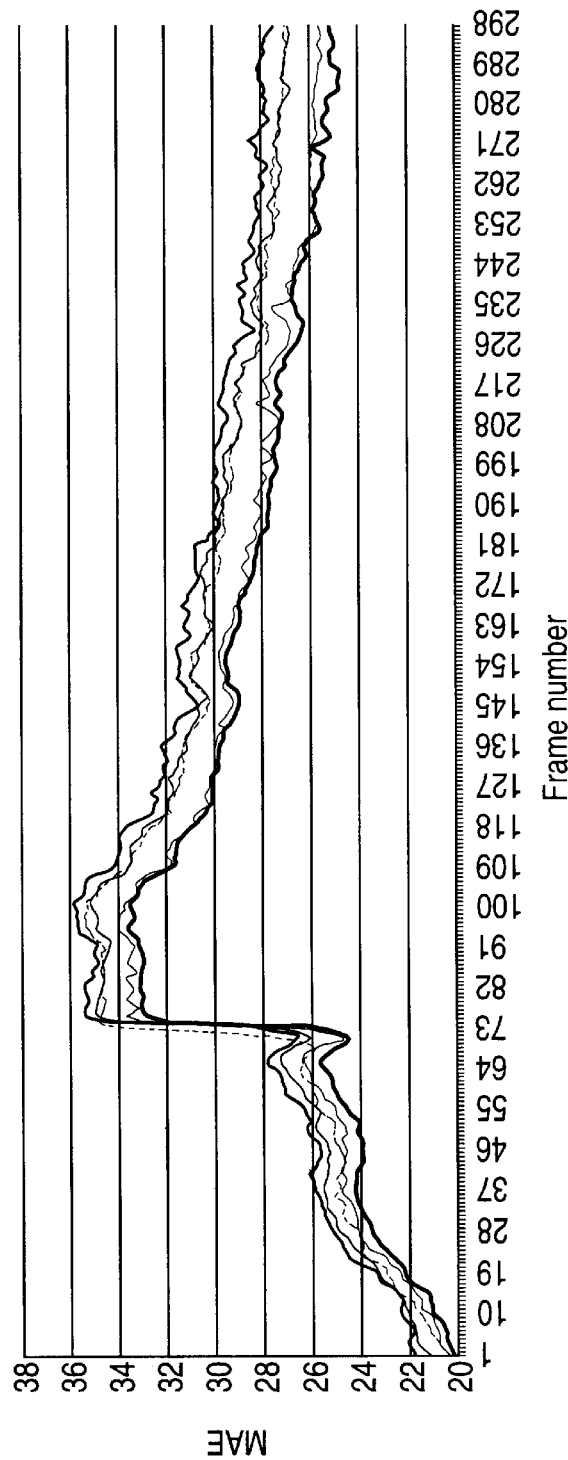
Figure 7C:
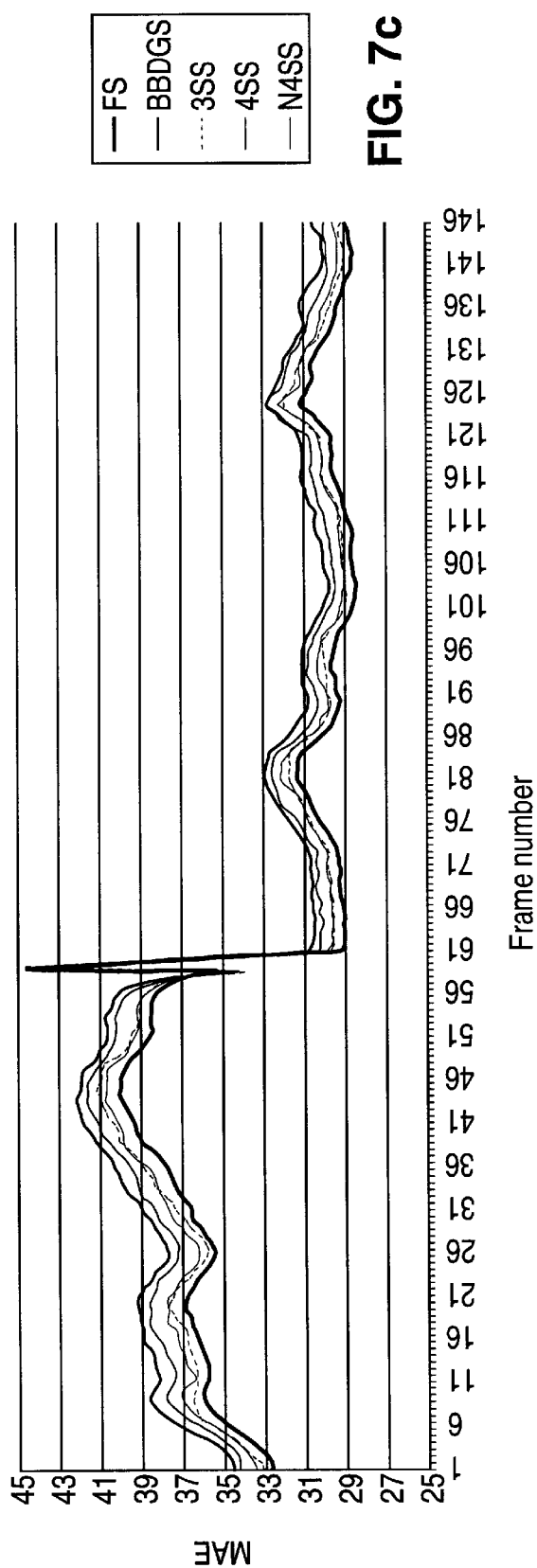
Figure 7D:
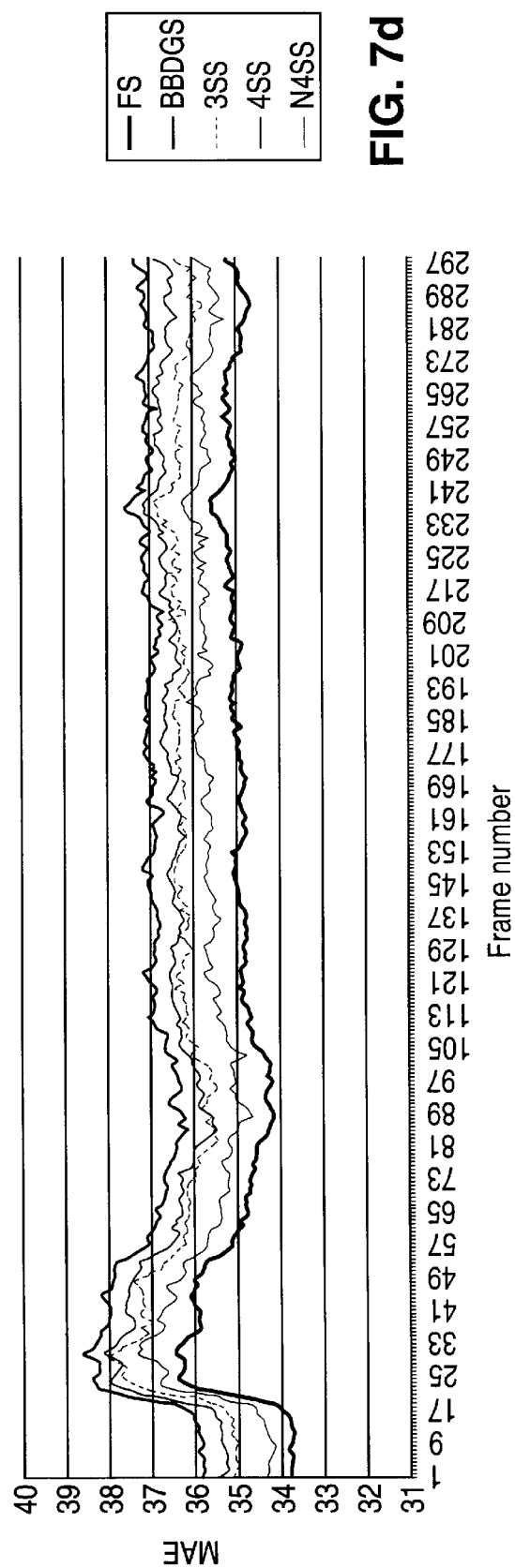
Figure 7E:
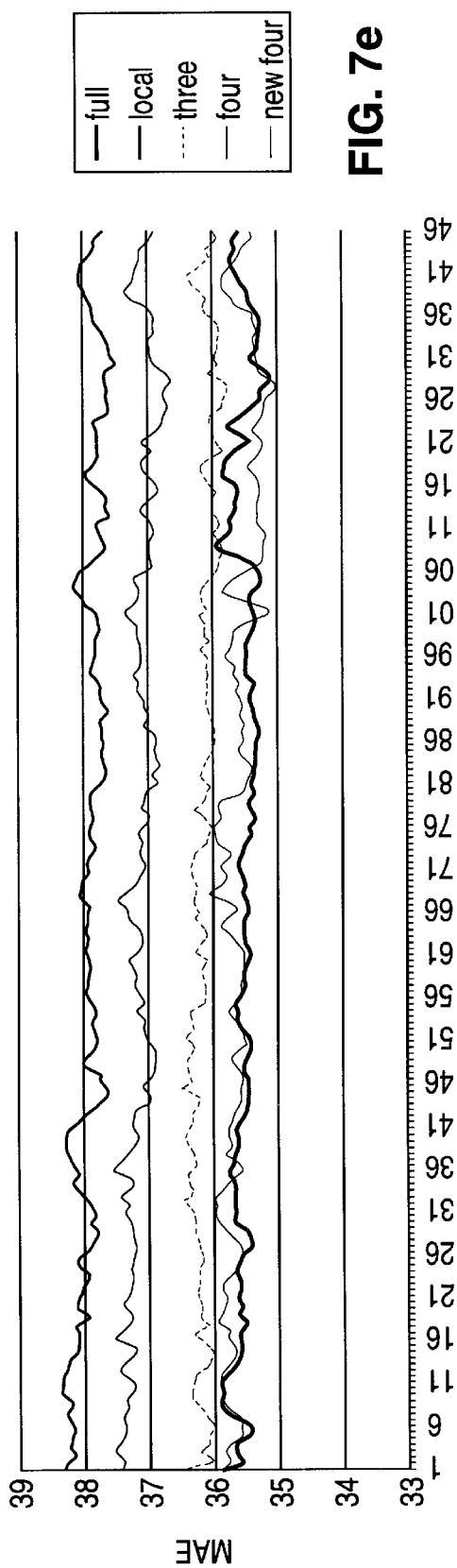
Figure 7F:
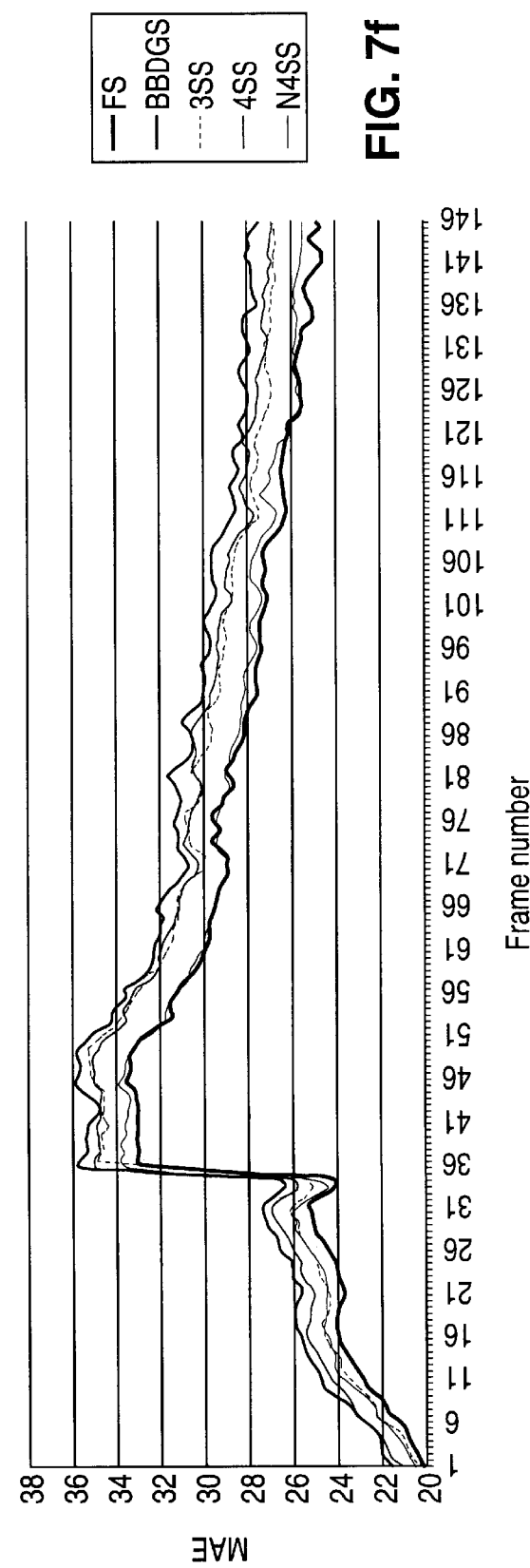
Figure 7G:
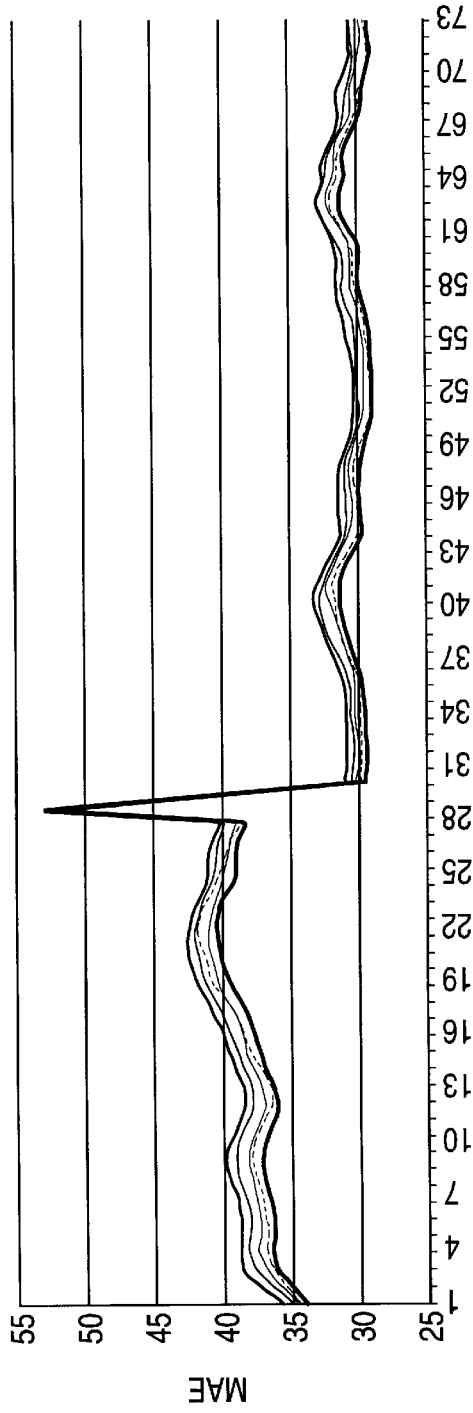
Figure 7H:
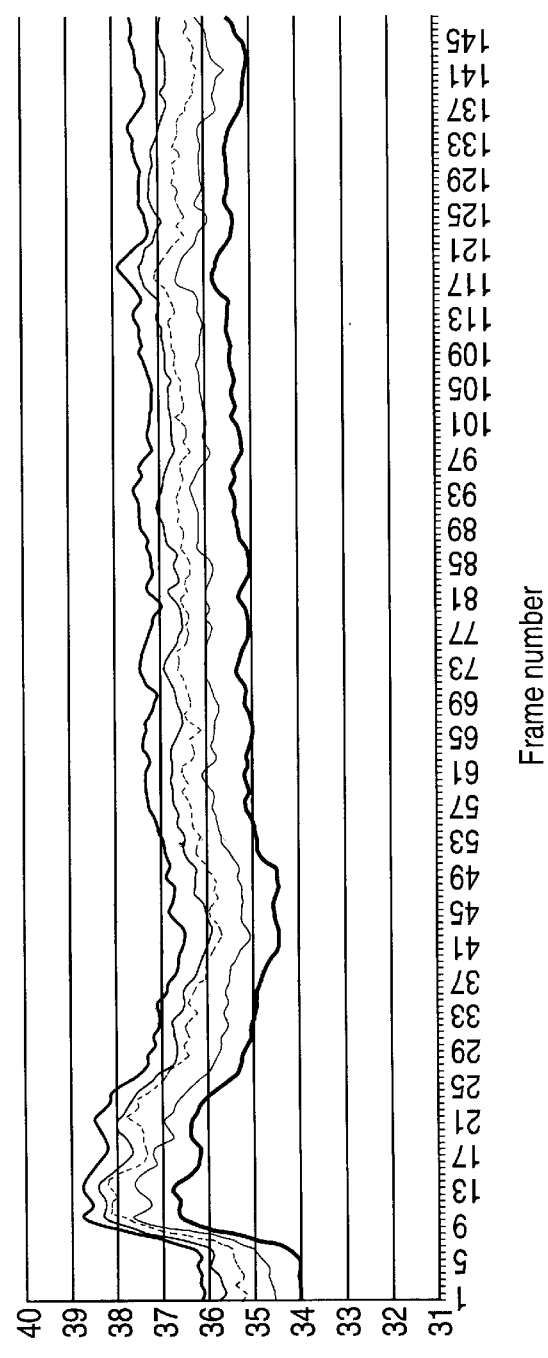

FIGS. 3(a) and 3(b) illustrate examples of the search path of the fast block motion estimation technique of FIGS. 2(a)–(g) executed in a 17×17 search window in accordance with one embodiment of the present invention. In particular, FIG. 3(a) shows two search paths that follow the monotonic gradient descent directions and extend to the furthest search locations in the search window. The search path in FIG. 3(b) shows the search path when quick stopping is applied for center-biased block motion estimation.

FIGS. 4(a) and 4(b) illustrate the expected number of BDM computations for each of the motion vectors of the fast block motion estimation technique executed in a 17×17 search window in accordance with one embodiment of the present invention. In particular, the minimum and maximum number of BDM computations required for each of the motion vectors is shown in FIGS. 4(a) and 4(b), respectively. Accordingly, as shown in FIGS. 4(a) and 4(b), the computation time variation between the best and worse case of the technique of this embodiment is not significant. Also, the average number BDM computations for each of the motion vectors are computationally efficient. Moreover, the technique of this embodiment is at least as efficient as other fast motion estimation techniques, as discussed below.

Accordingly, the technique of this embodiment reaches out as far as possible in each stage to search for larger motion blocks. This approach is critical to reducing the technique's susceptibility of being trapped in local minima of a non-convex shaped BDM surface. In particular, the dither-like search location down-sampling pattern in stage 2 provides the necessary tunneling capability to the minimization process, which is crucial, for example, for non-convex surface minimization with multiple local minima (i.e., a non-convex shaped BDM surface).

In one embodiment, the above-described technique can be extended to an unrestricted search window size by repeating stage 3 appropriately. In particular, instead of using a dither-like search pattern in stage 3, the search pattern in stage 3 is designed to achieve maximum overlap with the search pattern in the previous stage. Such an approach advantageously minimizes the number of search locations. As a result, when extending the technique of this embodiment to larger search window sizes, the number of search location examinations is actually minimized.

Figure 5:
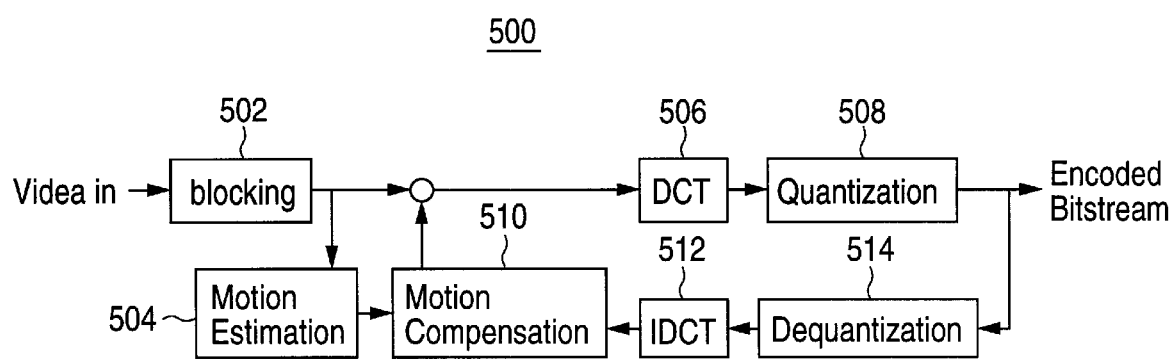
FIG. 5 is a block diagram of a video coder in accordance with one embodiment of the present invention.
Figure 2:
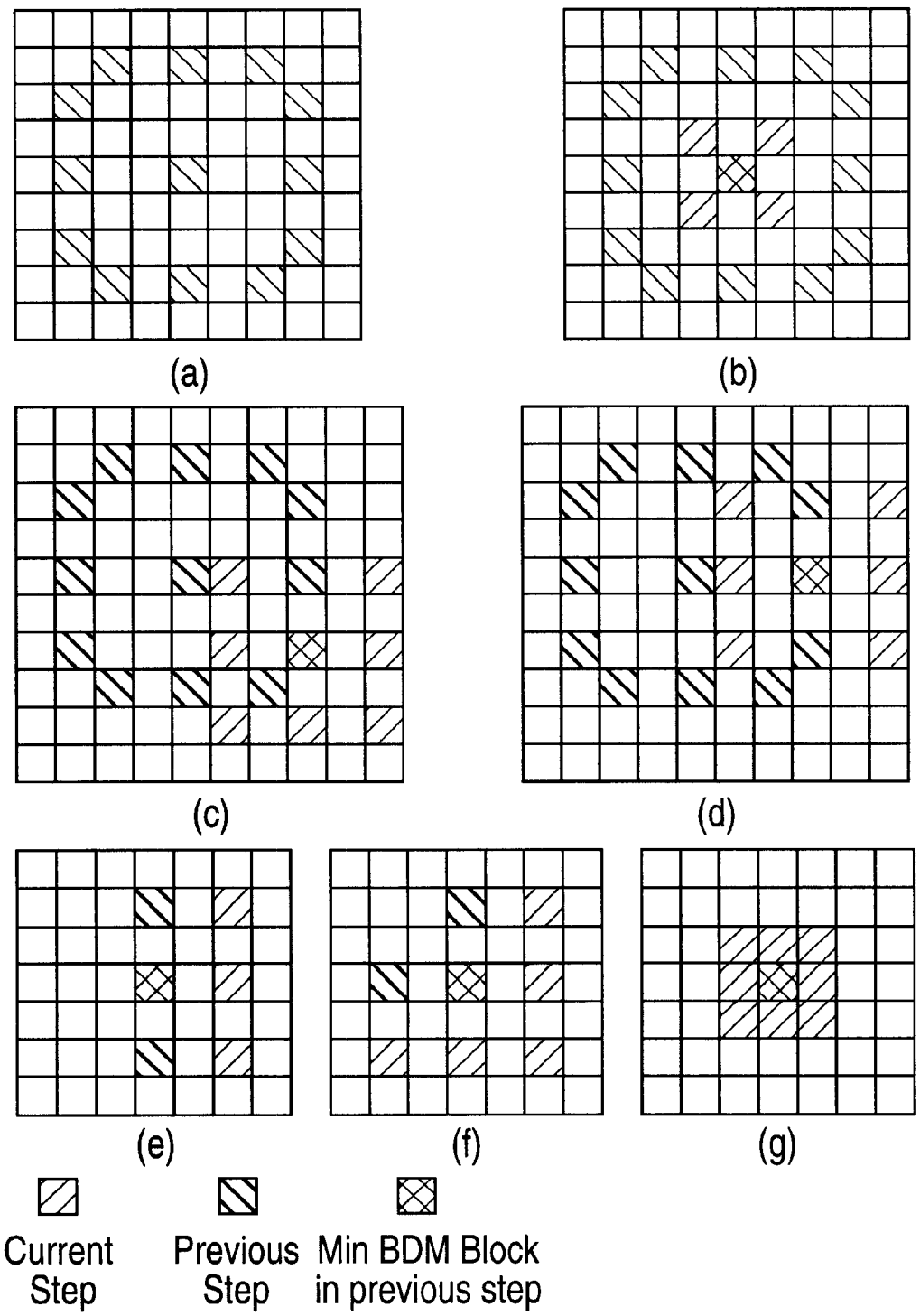
FIGS. 2(a)–(g) are block diagrams illustrating the stages of operation of the execution of a fast block motion estimation technique on a 7×7 search window in accordance with one embodiment of the present invention.

FIG. 5 is a block diagram of a video decoder in accordance with one embodiment of the present invention. In particular, FIG. 5 illustrates a DCT-based video coder 500, in which the input frames are divided into blocks of size 8×8 by a blocking module 502. Each block is motion compensated by a motion estimation module 504 and motion compensation module 510. The residues are DCT transformed by a DCT module 506 and quantized by a fixed uniform quantizer by a quantization module 508. Video coder 500 also includes an inverse DCT (IDCT) module 512 and a dequantizer module 514. Various motion estimation techniques are applied in video coder 500. In one embodiment, video coder 500 executes the fast block motion estimation technique discussed above with respect to FIGS. 2–4. In one embodiment, video coder 500 is implemented in software and executed on computer 100.

Referring to FIGS. 6 and 7, two sets of encoding parameters are used to measure the performance of the motion estimation techniques under different encoding environments. In the first set of encoding parameters, the quantization stage size is set equal to 10, and there is no frame skipping in the input video sequence. Such an encoding parameter provides the typical performance of the video coder and hence the motion estimation technique. In the second set of encoding parameters, the quantization stage size is set equal to 5, and the video coder will skip two frames from the input video sequence, which corresponds to a decimation ratio of 3:1 in the input video sequence. The high decimation ratio in the input video sequence will contribute to large motion vectors when encoding the video sequence. Furthermore, the fine quantization value results in more local minimum in the BDM surface. As a result, the second set of encoding parameters is aimed to measure the performance of the motion estimation technique under hostile conditions.

Different video sequences are used in the simulations that are plotted in FIGS. 6 and 7. The 'Akiyo' sequence provides the typical head and shoulder motion, which can test the average performance of various motion estimation techniques, for example, for a video conferencing application. The 'Trevor' sequence includes a complex motion field. Furthermore, the scene change in the 'Trevor' sequence can test the adaptation of various motion estimation techniques. The 'Coastal' sequence provides the translation motion field with large motion vectors, which can test the worst case performance of various motion estimation techniques, especially those fine tuned for center-biased motion fields. The 'Hall' sequence provides a motion field, which has objects appearing and disappearing from the scene. The Hall sequence can also test the adaptation of various motion estimation techniques. Furthermore, the motion field of the Hall sequence also contains large motion vectors.

FIGS. 6(a)–(h) are graphs of simulation results of the compression time per frame of a video coder (e.g., video coder 500) using different fast motion estimation techniques for a variety of video sequences. In particular, FIGS. 6(a)–(h) show that the compression times of various techniques are fluctuating around an average value. The technique in accordance with one embodiment of the present invention (as described above with respect to FIGS. 2–4), which is referred to in FIGS. 6 and 7 as N4SS, provides the least fluctuation, whereas the compression time is almost constant for various video sequences. The almost constant computational time performance of N4SS indicates that the average number of BDM computations in N4SS is very close for different video sequences. Furthermore, the average number of BDM computations in N4SS is very close to that of 4SS, which is smaller than N3SS, 3SS, and BBDGS. It should be noted that the time shown in FIGS. 6(a)–(h) represents the compression time of video coder 500, which excludes the time required to load the video sequence and store the encoded sequence.

FIGS. 7(a)–(h) are graphs of simulation results of the mean absolute error (MAE) per frame of different fast motion estimation techniques for a variety of video sequences. Without loss of generality, MAE is used as the metric for computing BDM. FIGS. 7(a)–(h) show that the motion estimation performance of N4SS is very close to FS and is smaller than 4SS, 3SS, and BBDGS. As shown in the MAE plot of the 'Trevor' sequence and the 'Coastal' sequence, the adaptation of N4SS is about as accurate as other fast motion estimation techniques, including FS. Also, in the simulations with two-frame skipping, the motion vectors are large. However, even in this hostile scenario, N4SS still provides very good performance that is very close to FS. In contrast, the motion estimation results of other fast motion estimation techniques deteriorate as the frame skipping number increases.

Accordingly, an improved fast motion estimation technique is provided. In one embodiment, the technique uses a new search location sub-sampling pattern to reduce the number of BDM computations. Different search location sub-sampling patterns are used in different search stages, which implements the tunneling process such that the search does not stop at the location of a local minimum but rather the location of the overall minimum BDM of a non-convex surface. One of ordinary skill in the art will recognize that a variety of search window sizes can be employed and a variety of sub-sampling patterns can be used in accordance with the teachings of the present invention. Simulation results illustrate that the technique in accordance with one embodiment of the present invention can escape from local minima and high quality motion estimation results are obtained. In particular, motion estimation results of the technique of one embodiment approach the accuracy of FS for a wide variety of video sequences. Moreover, the technique is also designed to have an almost constant time computational complexity for a wide variety of situations, which is shown to be at least comparable with the average performance of other fast motion estimation techniques. Such constant computational time performance is very important for resource allocations in video coders, especially for constant frame rate video coding.

Although particular embodiments of the present invention have been shown and described, it will be apparent to those of ordinary skill in the art that changes and modifications can be made without departing from the present invention in its broader aspects. For example, a variety of programming languages can be used to implement a fast block motion estimation technique in accordance with the teachings of the present invention, such as the well-known C++ or JAVA programming languages. Also, the present invention can be used with a variety of multimedia communication environments, such as the well-known MPEG-4 protocol or a variety of other video communication or multimedia communication protocols. Therefore, the pending claims are to encompass within their scope all such changes and modifications that fall within the true scope of the present invention.

What is claimed is:

1. A process for video compression using fast block motion estimation, the process comprising:

searching for a first minimum block distortion measure (BDM) point in a first search window using a first sampling grid of a second search window, wherein the second search window comprises a subset of search locations contained in the first search window;

searching for a second minimum BDM point in the first search window using a second sampling grid of a third search window, if the first minimum BDM point is located in a center of the second search window, wherein the third search window comprises a subset of the search locations contained in the first search window, and the third search window is centered according to a location of the first minimum BDM point;

searching for a third minimum BDM point in the first search window using a third sampling grid of a fourth search window, if the first minimum BDM point is not located in the center of the second search window, wherein the fourth search window comprises a subset of the search locations contained in the first search window, and wherein the fourth search window is centered according to the location of the first minimum BDM point;

searching for a fourth minimum BDM point in the first search window using a fourth sampling grid of a fifth search window, if each previously located minimum BDM point of the first search window is located outside of the second search window, wherein the fifth search window comprises a subset of search locations contained in the first search window, and the fifth search window is centered according to the location of the third minimum BDM point; and searching for a fifth minimum BDM point in the first search window using a fifth sampling grid of a sixth search window, wherein the sixth search window comprises a subset of search locations contained in the first search window, and the sixth search window is centered according to an overall minimum BDM point.

2. The process of claim 1 wherein the search windows and the search locations overlap, and overlapped search locations are skipped, and wherein the sampling grids each comprise different sub-sampling patterns of search locations of the first search window.

3. The process of claim 1 wherein the first search window comprises 17×17 search locations, the second search window comprises 7×7 search locations, the third search window comprises 3×3 search locations, the fourth search window comprises 5×5 search locations, the fifth search window comprises 5×5 search locations, and the sixth search window comprises 3×3 search locations.

4. The process of claim 1 wherein the first search window comprises more than 17×17 search locations, the process further comprising:

searching for an intermediate BDM point in the first search window using the fourth sampling grid of the fifth search window, if the previously located minimum BDM point is located on the fourth sampling grid of a previous search window, wherein a current search window is centered according to the location of the previously located minimum BDM point; and repeating the search for the intermediate BDM point for a predefined number of repetitions, if the previously located minimum BDM point is located on the fourth sampling grid of the previous search window.

5. The process of claim 4 wherein a first search window size equals a video frame size for global motion estimation.

6. The process of claim 5 wherein a video frame is interpolated, and the search windows operate on an interpolated frame for sub-pixel motion estimation.

7. The process of claim 1 wherein a video frame is interpolated, and the search windows operate on an interpolated frame for sub-pixel motion estimation.

8. An article of manufacture for video compression using fast block motion estimation, the article of manufacture comprising executable instructions, the executable instructions comprising:

instructions for searching for a first minimum block distortion measure (BDM) point in a first search window using a first sampling grid of a second search window, wherein the second search window comprises a subset of search locations contained in the first search window;

instructions for searching for a second minimum BDM point in the first search window using a second sampling grid of a third search window, if the first minimum BDM point is located in a center of the second search window, wherein the third search window comprises a subset of the search locations contained in the first search window, and the third search window is centered according to a location of the first minimum BDM point;

instructions for searching for a third minimum BDM point in the first search window using a third sampling grid of a fourth search window, if the first minimum BDM point is not located in the center of the second search window, wherein the fourth search window comprises a subset of the search locations contained in the first search window, and wherein the fourth search window is centered according to the location of the first minimum BDM point;

instructions for searching for a fourth minimum BDM point in the first search window using a fourth sampling grid of a fifth search window, if each previously located minimum BDM point of the first search window is located outside of the second search window, wherein the fifth search window comprises a subset of search locations contained in the first search window, and the fifth search window is centered according to the location of the third minimum BDM point; and instructions for searching for a fifth minimum BDM point in the first search window using a fifth sampling grid of a sixth search window, wherein the sixth search window comprises a subset of search locations contained in the first search window, and the sixth search window is centered according to an overall minimum BDM point.

9. The article of manufacture of claim 8 wherein the search windows and the search locations overlap, and overlapped search locations are skipped, and wherein the sampling grids each comprise different sub-sampling patterns of search locations of the first search window.

10. The article of manufacture of claim 8 wherein the first search window comprises 17×17 search locations, the second search window comprises 7×7 search locations, the third search window comprises 3×3 search locations, the fourth search window comprises 5×5 search locations, the fifth search window comprises 5×5 search locations, and the sixth search window comprises 3×3 search locations.

11. The article of manufacture of claim 8 the first search window comprises more than 17×17 search locations, the executable instructions further comprising:

instructions for searching for an intermediate BDM point in the first search window using the fourth sampling grid of the fifth search window, if the previously located minimum BDM point is located on the fourth sampling grid of a previous search window, wherein a current search window is centered according to the location of the previously located minimum BDM point; and instructions for repeating the search for the intermediate BDM point for a predefined number of repetitions, if the previously located minimum BDM point is located on the fourth sampling grid of the previous search window.

12. The article of manufacture of claim 11 wherein a first search window size equals a video frame size for global motion estimation, and wherein a video frame is interpolated, and the search windows operate on an interpolated frame for sub-pixel motion estimation.

13. A machine executing instructions for video compression using fast block motion estimation, the machine comprising:

instructions executed on the microprocessor of the machine for searching for a first minimum block distortion measure (BDM) point in a first search window using a first sampling grid of a second search window, wherein the second search window comprises a subset of search locations contained in the first search window;

instructions executed on the microprocessor of the machine for searching for a second minimum BDM point in the first search window using a second sampling grid of a third search window, if the first minimum BDM point is located in a center of the second search window, wherein the third search window comprises a subset of the search locations contained in the first search window, and the third search window is centered according to a location of the first minimum BDM point;

instructions executed on the microprocessor of the machine for searching for a third minimum BDM point in the first search window using a third sampling grid of a fourth search window, if the first minimum BDM point is not located in the center of the second search window, wherein the fourth search window comprises a subset of the search locations contained in the first search window, and wherein the fourth search window is centered according to the location of the first minimum BDM point;

instructions executed on the microprocessor of the machine for searching for a fourth minimum BDM point in the first search window using a fourth sampling grid of a fifth search window, if each previously located minimum BDM point of the first search window is located outside of the second search window, wherein the fifth search window comprises a subset of search locations contained in the first search window, and the fifth search window is centered according to the location of the third minimum BDM point; and instructions executed on the microprocessor of the machine for searching for a fifth minimum BDM point in the first search window using a fifth sampling grid of a sixth search window, wherein the sixth search window comprises a subset of search locations contained in the first search window, and the sixth search window is centered according to an overall minimum BDM point.

14. The machine of claim 13 wherein the search windows and the search locations overlap, and overlapped search locations are skipped, and wherein the sampling grids each comprise different sub-sampling patterns of search locations of the first search window.

15. The machine of claim 13 wherein the first search window comprises 17×17 search locations, the second search window comprises 7×7 search locations, the third search window comprises 3×3 search locations, the fourth search window comprises 5×5 search locations, the fifth search window comprises 5×5 search locations, and the sixth search window comprises 3×3 search locations.

16. The machine of claim 13 wherein the first search window comprises more than 17×17 search locations, the machine further comprising:

instructions executed on the microprocessor of the machine for searching for an intermediate BDM point in the first search window using the fourth sampling grid of the fifth search window, if the previously located minimum BDM point is located on the fourth sampling grid of a previous search window, wherein a current search window is centered according to the location of the previously located minimum BDM point; and instructions executed on the microprocessor of the machine for repeating the search for the intermediate BDM point for a predefined number of repetitions, if the previously located minimum BDM point is located on the fourth sampling grid of the previous search window.

17. The machine of claim 16 wherein a first search window size equals a video frame size for global motion estimation, and wherein a video frame is interpolated, and the search windows operate on an interpolated frame for sub-pixel motion estimation.

18. The machine of claim 13 wherein a video frame is interpolated, and the search windows operate on an interpolated frame for sub-pixel motion estimation.

* * * * *